(12) United States Patent
Groβ

(10) Patent No.: US 7,857,009 B2
(45) Date of Patent: Dec. 28, 2010

(54) INCREASING THE BENDING STRENGTH OF TUBES

(75) Inventor: Stefan Groβ, Trabitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 12/361,971

(22) Filed: Jan. 29, 2009

(65) Prior Publication Data

US 2009/0194186 A1    Aug. 6, 2009

(30) Foreign Application Priority Data

Feb. 5, 2008    (DE) .................. 10 2008 007 552

(51) Int. Cl.
F16L 35/00    (2006.01)
(52) U.S. Cl. .................. 138/110; 138/DIG. 8
(58) Field of Classification Search ............. 138/110, 138/108, DIG. 8
See application file for complete search history.

(56) References Cited

U.S. PATENT DOCUMENTS

| | | | | |
|---|---|---|---|---|
| 805,579 | A * | 11/1905 | Patchen | 464/173 |
| 1,372,629 | A * | 3/1921 | Osley | 138/110 |
| 1,668,953 | A * | 5/1928 | Erickson | 174/101 |
| 2,166,448 | A * | 7/1939 | Schuknecht et al. | 285/116 |
| 2,172,130 | A * | 9/1939 | Powell | 138/110 |
| 2,185,741 | A * | 1/1940 | Sorg et al. | 285/115 |
| 2,544,121 | A * | 3/1951 | Hix et al. | 138/110 |
| 2,640,502 | A * | 6/1953 | Powers | 285/114 |
| 2,769,999 | A * | 11/1956 | Sheahan | 15/327.2 |
| 3,032,357 | A * | 5/1962 | Shames et al. | 285/114 |
| 3,402,741 | A * | 9/1968 | Yurdin | 138/118 |
| 3,498,335 | A * | 3/1970 | Cook | 138/178 |
| 3,610,289 | A * | 10/1971 | Moss | 138/90 |
| 3,889,717 | A * | 6/1975 | Obadal et al. | 138/131 |
| 4,151,864 | A * | 5/1979 | Thurman | 138/106 |
| 4,327,775 | A * | 5/1982 | Tally | 138/103 |

(Continued)

FOREIGN PATENT DOCUMENTS

DE    1 956 142    2/1967

OTHER PUBLICATIONS

German Office Action dated Dec. 8, 2008 with English translation.

*Primary Examiner*—James F Hook
(74) *Attorney, Agent, or Firm*—Brinks Hofer Gilson & Lione

(57) ABSTRACT

An apparatus for increasing the bending strength of tubes is provided. The apparatus may include an adapter and at least one sprint element. The adapter may have a shape that is matched to a cross-sectional shape of a tube end in such a manner that the adapter may be fitted to a tube connection of a device instead of the tube end and the tube end may be fitted to the adapter. The at least one spring element may be connected to the adapter. The at least one spring element may project out of the adapter in the direction of the tube. The at least one spring element may include a holding element at the projecting end. The holding element matches the cross-sectional shape of the tube and describes at least half the periphery of the tube. A fitted tube abuts against the holding element when the tube is subjected to bending. The rigidity of the spring element increases the bending strength of the tube in the region between the adapter unit and the holding element.

13 Claims, 2 Drawing Sheets

U.S. PATENT DOCUMENTS 6,048,329 A * 4/2000 Thompson et al. ....... 604/95.04
6,557,589 B2 * 5/2003 Bozic et al. ................. 138/106
6,604,549 B2 * 8/2003 Gauthier et al. ............. 138/108
2010/0180974 A1 * 7/2010 Gross et al. ................. 138/110

* cited by examiner

INCREASING THE BENDING STRENGTH OF TUBES

The present patent document claims the benefit of the filing date of DE 10 2008 007 552.3 filed Feb. 5, 2008, which is hereby incorporated by reference.

BACKGROUND

The present embodiments relate to increasing the bending strength of a tube in a connection region.

Different types of tubes are used in everyday life and technology. Tubes serve as flexible tubing for the transportation of solid, liquid and gaseous substances. Tubes may be used where pipelines cannot be deployed for physical or economic reasons, for example, at movable output and destination sites, locations that are difficult to access, or where pipes would be too heavy or too expensive. Tubes are also used as protective sheathing or for insulation.

Cable trees, for example, which supply robot arms, are carried in flexible tubes, such as corrugated tubes, to protect the cable trees from external influences.

Tubes are generally manufactured and sold as low cost goods by the meter. Accordingly, it is not possible, at least without significant outlay, to achieve different levels of rigidity along a tube. However, a greater rigidity is frequently desirable at points where the tube is secured to a device housing and where significant bending regularly occurs, to prevent the tube kinking too much at these points and being damaged in the process. At the same time long tubes tend to oscillate when moved in a certain manner and this can also be prevented or at least limited by greater rigidity at the tube connection points.

SUMMARY AND DESCRIPTION

The present embodiments may obviate one or more of the problems or drawbacks inherent in the related art. For example, in one embodiment, an apparatus is used to increase the bending strength of a tube in a connection region.

In one embodiment, an apparatus includes an adapter and at least one spring element. The adapter has a shape that is matched to a cross-sectional shape of a tube end in such a manner that the adapter may be fitted to a tube connection of a device instead of the tube end and the tube end may be fitted to the adapter. The at least one spring element may be connected to the adapter. The at least one spring element may project out of the adapter in the direction of the tube. The at least one spring element may include a holding element at the projecting end. The holding element matches the cross-sectional shape of the tube and describes at least half the periphery of the tube. A fitted tube abuts against the holding element when the tube is subjected to bending. The rigidity of the spring element increases the bending strength of the tube in the region between the adapter unit and the holding element.

One advantage of the apparatus is that tubes can be made more rigid at the housing connection at a later stage.

The apparatus may include a number of spring elements of different length with corresponding holding elements. Accordingly, an apparatus may be produced, with which it is possible to achieve a significant increase in the bending strength of the tube in the region of the tube end. The bending strength may gradually decrease in the direction of the tube.

The spring elements may have different levels of rigidity.

A number of holding elements for a spring element may be provided to improve the coupling between a spring element and the tube.

In one embodiment, at least one spring element may have a direction-dependent rigidity, for example, to inhibit the kinking of the tube in a specific direction.

In one embodiment, the adapter may include two or more parts. The division into two or more parts allows the adapter to be fitted around an object running in the interior of the adapter in the fitted state, for example, a cable harness. This allows the retrofitting of already installed systems, in which the tube to be reinforced protects a lead running in the interior or a cable harness.

The apparatus is suitable for reinforcing the tube both from the inside and from the outside. One advantage of reinforcing the tube from the outside is that the full internal diameter of the tube may be used for a given application.

In one embodiment, the apparatus comprises three spring elements of different lengths. The spring elements have holding elements that roughly form a closed circle. The holding elements are arranged perpendicular to the spring elements. The spring elements and the holding elements may be bent as a single piece from spring steel wire and the ends of the spring steel wire on the holding element side may be configured as loops. The loops prevent damage to the tube and any leads or cables running in the interior of the tube.

DETAILED DESCRIPTION

Figure 1:
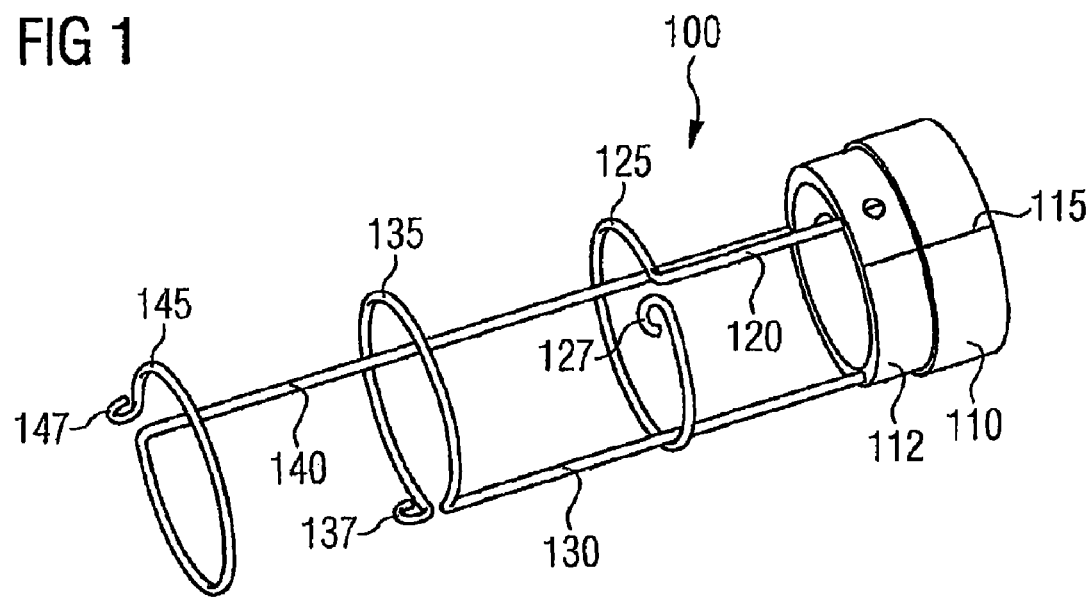
FIG. 1 shows an apparatus used to increase the bending strength of a tube in a connection region according to a first exemplary embodiment.

FIG. 1 shows an apparatus 100, which can be used to increase the bending strength of a tube 200 in a connection region. The apparatus 100 may include an adapter 110. The adapter 110 may be attached to a tube connection of a device instead of the tube 200. The adapter 110 has a region 112. A tube 200 may be fitted to the region 112. The shape and dimensions of the adapter 110 are tailored to the shape and dimensions of the tube and the tube connection.

For tubes 200 with an essentially circular cross section, the adapter 110 has two essentially cylindrical regions of different diameter. The internal diameter of the first region may be selected such that it is possible to fit the adapter 110 to the tube connection of the device. The external diameter of the second region 112 may be selected such that it is possible to fit the tube 200 to the adapter unit 110.

In one embodiment, the adapter unit 110 includes two parts, which are shown assembled along the line 115. The apparatus 110 may be broken down into two parts and fitted around an object running in the interior of the tube, for example, an inner tube or a cable harness. Accordingly, the apparatus may be retrofit to constructed devices.

FIG. 1 shows three spring elements 120, 130, 140 secured to the adapter 110. The spring elements 120, 130, 140 run in the interior of the tube 200 that is pushed onto the apparatus 100. The tube 200 abuts against the spring elements 120, 130, 140 by holding elements 125, 135, 145. The shape and dimensions of the holding elements 125, 135, 145 are also tailored to the shape and dimensions of the cross section of the tube 200. The spring elements 120, 130, 140 may run on the inside the tube 200 when the tube 200 is pushed over the holding elements. The spring elements 120, 130, 140 may run on the outside of the tube 200 when the tube 200 is inserted into the spring elements 120, 130, 140.

Essentially circular holding elements 125, 135, 145 are shown, which do not describe a full circle, to allow subsequent fitting. The holding elements 125, 135, 145 may open into loops 127, 137, 147, to prevent penetration through the wall of the tube 200 and to protect the tube 200 running in the interior or the cable harness from damage due to sharp edges. Each spring element 120 (130, 140) is preferably produced as a single piece by bending from spring steel with a holding element 125 (135, 145) and loop 127 (137, 147).

In the tube region between the adapter unit and the first holding element 125 in the example in FIG. 1, the three spring elements 120, 130, 140 are acting as stiffening elements, with two spring elements 130, 140 between the first holding element 125 and the second holding element 135 and just one spring element 140 between the second holding element 135 and the third holding element 145. Accordingly, the rigidity of the apparatus 100 and therefore also the tube 200 fitted over the apparatus 100 gradually decreases, so that no new, sharp kinking points result at the tube-side end of the apparatus.

The rigidity of the apparatus 100 may be varied over the length of the apparatus by using spring elements 120, 130, 140 of different thickness and by varying the number of spring elements 120, 130, 140. Spring elements 120, 130, 140 that taper in the direction of the holding elements 125, 135, 145 may be used. The spring elements 120, 130, 140 may be more flexible further away from the adapter 110. Accordingly, the rigidity pattern of the apparatus 100 may be consistent.

Figure 2A:
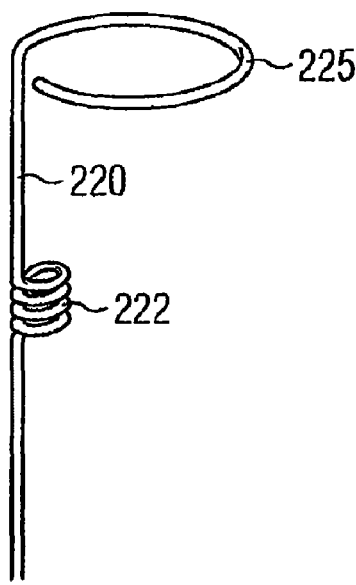
FIGS. 2a-c show schematic diagrams of apparatuses according to further exemplary embodiments.
Figure 2B:
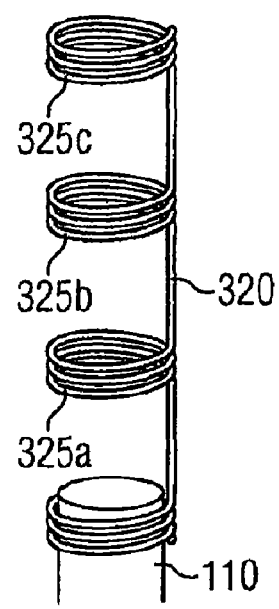
Figure 2C:
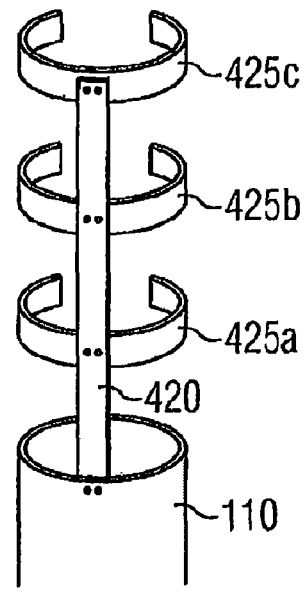

Further exemplary embodiments, which can all be combined with one another, are shown in FIGS. 2a-c. FIG. 2a shows an individual spring element 220 with a holding element 225, which has a longitudinally extended structure like one of the spring elements 120, 130, 140 from FIG. 1 but also has a number of spring windings between the adapter 10 and the holding element 225. These spring windings serve to increase the ability of the spring element 220 to move at this point.

FIG. 2b shows a spring element 320 with a number of holding elements 325a-c. The holding elements 325a-c may be spring windings.

FIG. 2c finally shows a leaf spring element 420, which projects out of the adapter 110 and has three holding elements 425a-c. Using a leaf spring element 420 instead of a round spring element 120, 130, 140 brings about a direction-dependent increase in rigidity or a preferred bending direction of the apparatus 100. An apparatus 100 fitted with leaf spring elements 420 may be used for example, if the tube 200 is only to bend in one direction in the region of the device connection.

Figure 3:
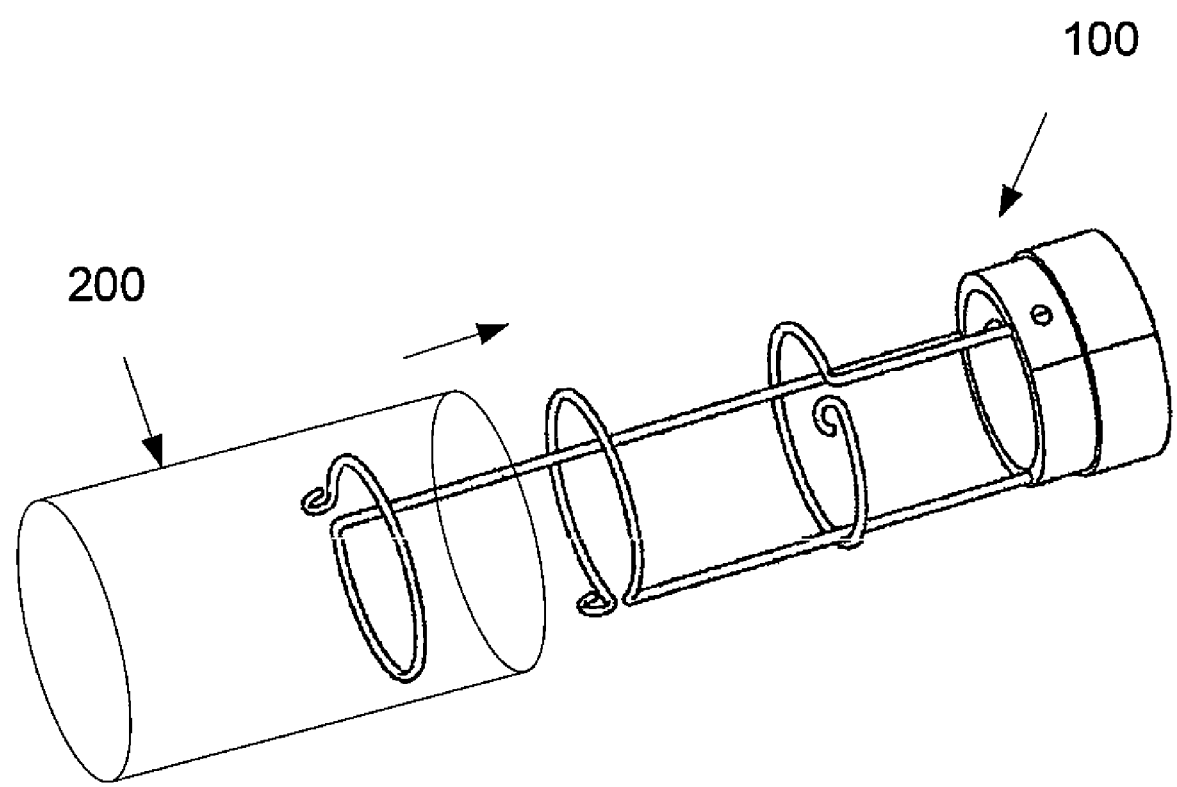
FIG. 3 shows the apparatus of FIG. 1 with a tube.

FIG. 3 illustrates the tube 200 being pushed onto the apparatus 100.

Although the described exemplary embodiments are adapted for tubes with a circular cross section, the present embodiments are not restricted to circular cross sections. Rather the present embodiments relate to apparatuses for any tube cross sections, for example, for tubes with a rectangular cross section with rounded corners. The present embodiments may be used in conjunction with any types of tube, for example, corrugated tubes, articulated tubes, or other tubes.

Various embodiments described herein can be used alone or in combination with one another. The forgoing detailed description has described only a few of the many possible implementations of the present invention. For this reason, this detailed description is intended by way of illustration, and not by way of limitation. It is only the following claims, including all equivalents that are intended to define the scope of this invention.

The invention claimed is:

1. An apparatus for increasing a bending strength of a tube, the apparatus comprising:
   an adapter shaped to match a cross-sectional shape of the tube, the adapter being shaped to be fitted to a tube connection of a device and the tube, the adapter including a first cylindrical region that includes a first diameter that fits onto the tube connection and a second cylindrical region that includes a second diameter that fits into the tube, the second diameter being different than the first diameter; and
   a plurality of spring elements connected to the adapter, each of the spring elements of the plurality projecting out of the second cylindrical region of the adapter in a direction of the tube and having a holding element at a projecting end, the holding elements matching the cross-sectional shape of the tube and describing at least half the periphery of the tube,
   wherein the holding elements are configured to abut against the tube when the tube is subjected to bending, so that the rigidity of the spring elements increases the bending strength of the tube in a region between the adapter and the holding element.

2. The apparatus as claimed in claim 1, wherein the plurality of spring elements have different lengths, the plurality of spring elements having corresponding holding elements, so that an increase in the bending strength of the tube is achieved in a region of the adapter, decreasing gradually in the direction of the tube.

3. The apparatus as claimed in claim 2, wherein the plurality of spring elements have different rigidities.

4. The apparatus as claimed in claim 1, wherein each of the spring elements of the plurality includes a plurality of holding elements.

5. The apparatus as claimed in claim 1, wherein at least one spring element of the plurality has a direction-dependent rigidity.

6. The apparatus as claimed in claim 1, wherein the adapter includes at least two parts, a first of the at least two parts being fitted around an object running in the interior of the adapter in the fitted state.

7. The apparatus as claimed in claim 6, wherein the object running in the interior of the adapter is a cable harness.

8. The apparatus as claimed in claim 6, wherein the fitted tube is fitted around a second of the at least two parts.

9. The apparatus as claimed in claim 1, wherein the plurality of spring elements run in the interior of the fitted tube.

10. The apparatus as claimed in claim 9, comprising three spring elements of different length, the three spring elements having holding elements forming a closed circle, the holding elements being arranged perpendicular to the spring elements, with the spring elements and the holding elements being bent as a single piece from spring steel wire.

11. The apparatus as claimed in claim 10, wherein ends of the spring steel wire on a holding element side are loops.

12. The apparatus as claimed in claim 1, wherein the plurality of spring elements run outside the fitted tube.

13. An adapter for increasing the bending strength of a tube, the adapter comprising:
   a first cylindrical region having a first diameter that matches a cross-sectional size of the tube such that the first cylindrical region is configured to fit onto a tube connection of the tube;

a second cylindrical region that includes a second diameter that is sized to fit into the tube, the second diameter being different than the first diameter; and at least one spring element including a holding element that extends out of the second cylindrical region of the adapter in a direction away from the first and second cylindrical regions, wherein the at least one spring element is configured to abut against and increase a bending strength of the tube.

* * * * *